Patented Apr. 18, 1933

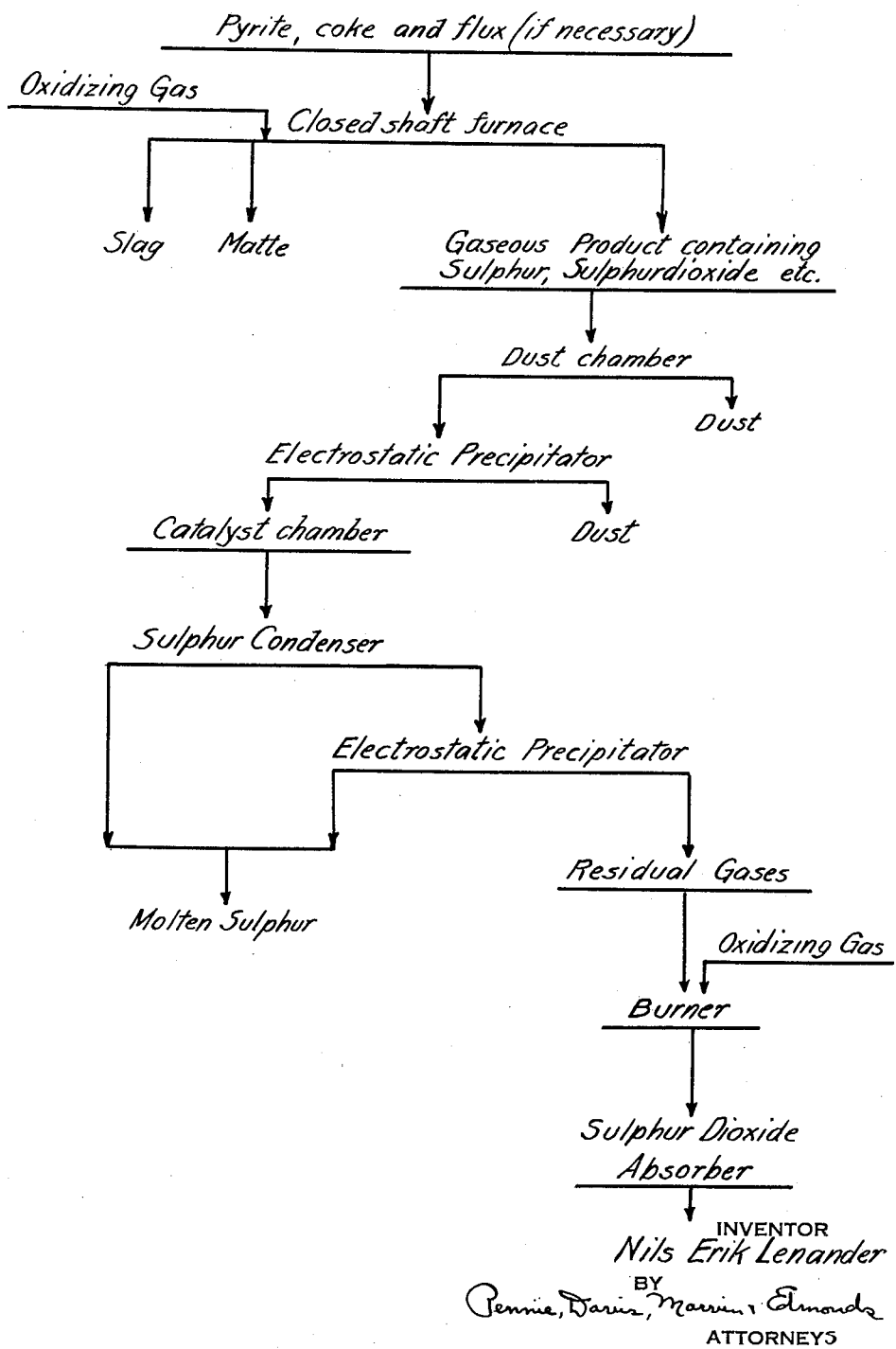

1,904,481

UNITED STATES PATENT OFFICE

NILS ERIK LENANDER, OF LOKKEN VERK, NORWAY, ASSIGNOR, BY MESNE ASSIGNMENTS, TO TEXAS GULF SULPHUR COMPANY, OF HOUSTON, TEXAS, A CORPORATION OF TEXAS

PROCESS OF RECOVERING SULPHUR FROM SULPHIDE MINERALS

Application filed May 13, 1930, Serial No. 452,139, and in Great Britain April 5, 1930.

In smelting sulphide minerals such as cuprous pyrites in a shaft furnace, whether the smelting is done with fuel (coke) admixed with the charge or without any such admixture, substantially the whole of the sulphur driven off ultimately escapes with the gases as sulphur dioxide which is not as a rule utilized but causes serious inconveniences when let off into the atmosphere.

I have found that if sulphide minerals are smelted together with a solid reducing agent, e. g. coke, in a completely enclosed shaft furnace the greater part of the sulphur may be driven off as elemental sulphur and the remainder in the form of gaseous or volatile sulphur compounds, such as sulphur dioxide, hydrogen sulphide, carbon oxysulphide, carbon disulphide, etc., and that by treating the gases passing from the furnace according to the method described below I may recover substantially the whole of the sulphur other than that left in the matte and slag, as elemental sulphur of a high degree of purity.

In accordance with my invention the mineral to be treated is mixed with a solid reducing agent, such as coke, and the fluxes that may be needed and smelted in a perfectly enclosed shaft furnace, air being blown in through tuyères near the bottom of the furnace in a known manner. The furnace may be provided at the throat with a double stopper and has an exit pipe for removal of the gaseous and volatile products. The quantity of the admixed reducing means varies according to the composition of the mineral—from 1 to 2% up to 10%.

The single figure of the accompanying drawing is a diagrammatic flow sheet of an installation for practicing the invention.

The metallurgic progress when smelting pyrites in a shaft furnace is substantially as follows.

In the upper zone of the furnace the principal reaction is that one sulphur atom of the pyrite is driven off and escapes with the gases as gaseous sulphur. Lower in the furnace the ascending sulphur dioxide is reduced more or less completely by the reducing agent and partly by the carbon monoxide. In this reaction zone certain organic sulphur compounds are also formed, such as carbon disulphide, carbon oxysulphide, etc., as well as more or less hydrogen sulphide, dependent upon the available hydrogen content of the gases. By means of the blast at the bottom of the furnace, part of the FeS is oxidized here to FeO which goes into the slag, and $SO_2$. Besides, the reducing carbon which may be in excess is oxidized to $CO_2$ and CO. By these reactions such a quantity of heat is generated as to form a molten slag which can be tapped off. The part of the FeS which is not oxidized forms with the $Cu_2S$ and other metallic sulphides that may be present a matte which is tapped off in the same way as the slag.

The blast is adjusted so that practically no free oxygen is present in the exit gases. These gases consequently (besides the elemental sulphur vapor) contain the gaseous volatile sulphur compounds of which mention has been made above. The amount and composition of these compounds varies according to the moisture present in the charge, the quantity of reducing means, and the speed with which the gases pass through the furnace.

If allowed to escape into the atmosphere, these gases would be most injurious and would result in a considerable loss of sulphur. I have now discovered that it is possible, in connection with the smelting operations to recover almost the whole of the sulphur contents by treating the gases from the furnace in the way described below.

For the purpose of this treatment the gases should be at a temperature in the neighbourhood of 400° C. This temperature can be controlled by regulating the furnace working and, if necessary, by preheating the solid charge fed in.

The gases are first caused to traverse a dust chamber and then pass a precipitating chamber, preferably of the electrostatic type, to remove all dust and fume carried over from the furnace. Valuable metals in the form of metal oxides or metal sulphides are arrested at this point, and recovered.

The purified gases then pass to a chamber filled with a suitable contact mass or catalyst. For instance suitable catalysts are metallic oxides, such as bauxite or mixtures of metallic oxides. It is, however, preferable that such oxides should not be completely dehydrated, but should contain some proportion of combined water. The temperature of the catalyst chamber should be maintained at 350–400° C.

The gaseous and volatile sulphur compounds now react with each other substantially according to the following equations:

$$CS_2 + SO_2 = CO_2 + 3S$$
$$2COS + SO_2 = 2CO_2 + 3S$$
$$2H_2S + SO_2 = 2H_2O + 3S$$

The reactions which occur are exothermic, and the temperature of the gases rises during the passage through the catalyst chamber. The operation should be so controlled that the temperature of the exit gases does not greatly exceed 400°C.

The exit gases from the catalyst chamber will now be practically free from all sulphur compounds, except sulphur dioxide. The amount of sulphur dioxide will generally be small, but in some cases may be sufficiently high to justify further treatment. To deal with such amounts of sulphur dioxide I may introduce into the gases leaving the catalyst chamber, the necessary amount of carbon monoxide as producer gas or otherwise. The mixed gases are caused to pass another catalyst chamber where the sulphur dioxide is reduced in accordance with the equation:

$$SO_2 + 2CO = 2CO_2 + S$$

The gases now pass to a condenser, preferably in the form of a water tube boiler in order to utilize the heat of the gases.

The gases are cooled here to a temperature of 120 to 150° C. whereby the greater part of the sulphur is condensed, and about half of the sulphur is precipitated as molten sulphur which is caused to flow out through a seal. The heat removed in the boiler may be employed to product steam which supplies sufficient power for the whole of the process.

The exit gases from the condenser then pass to another precipitating chamber preferably of the electrostatic type, the temperature of which is maintained at 125 to 130° C., and in which the remainder of the elementary sulphur is precipitated and obtained in the molten condition.

The gases leaving the apparatus now contain only traces of sulphur and sulphur compounds, and may be allowed to escape to the atmosphere. If it is desired to remove all traces of sulphur and sulphur compounds still remaining, I may cause the gases after having been heated to pass through a burner, together with a little air, so that all the sulphur and sulphur compounds are burnt to sulphur dioxide.

The burner should preferably include a catalyst chamber which facilitates the oxidation of the last traces of sulphur and sulphur compounds. The sulphur dioxide so formed may be absorbed by passing the gases through a scrubber containing, for example, limestone sprinkled with water or a suitable absorption means.

By the process described above I recover, in elementary form and in an extremely high degree of purity, substantially the whole of the sulphur driven off from the mineral treated and existing in the exit gases of the smelting furnace as elemental sulphur and sulphur compounds.

Having now particularly described the nature of my invention and the manner of its operation, what I claim is:

1. The process of smelting pyrites with the recovery as elemental sulphur of a large part of the pyrite sulphur which comprises smelting the pyrites with coke and flux (if necessary) in a closed shaft furnace provided with means for the introduction of an oxidizing gas approximate the bottom thereof and thereby producing molten slag and matte and a gaseous product containing elemental sulphur vapour, sulphur dioxide and other sulphur compounds, withdrawing said gaseous product from the furnace and passing it through a dust chamber and an electrostatic precipitating chamber for the removal of suspended solid particles, passing the resulting dust-freed gas at a temperature of about 400° C. through a chamber containing an appropriate catalyst for promoting the interaction of the sulphur dioxide and other sulphur compounds therein to form elemental sulphur, cooling the so treated gases to condense and recover a substantial part of the elemental sulphur therein, and passing the remaining gases cooled to a temperature of about 125° C. through an electrostatic precipitator in which substantially all of the remaining elemental sulphur is precipitated and collected in molten form.

2. A process of smelting pyrites with the recovery as elemental sulphur of a large part of the pyrite sulphur which comprises smelting the pyrites with coke and flux (if necessary) in a closed shaft furnace provided with means for the introduction of an oxidizing gas approximate the bottom thereof and thereby producing molten slag and matte and a gaseous product containing elemental sulphur vapour, sulphur dioxide and other sulphur compounds, withdrawing said gaseous product from the furnace and passing it at a temperature of about 400° C. through a chamber containing an appropriate catalyst for promoting the interaction of the sulphur dioxide and other sulphur compounds therein to form elemental sulphur, cooling the so treated gaseous product to condense and recover the elemental sulphur therein, and removing such traces of sulphur and compounds thereof as remain in the residual gases by heating said gases in the presence of an oxidizing gas at a sufficiently high temperature to convert the sulphur and compounds thereof to sulphur dioxide and passing the resulting gases through an appropriate medium for absorbing the sulphur dioxide therein.

NILS ERIK LENANDER.